United States Patent [19]
Patton

[11] Patent Number: 5,985,523
[45] Date of Patent: *Nov. 16, 1999

[54] METHOD FOR IRRADIATING PATTERNS IN OPTICAL WAVEGUIDES CONTAINING RADIATION SENSITIVE CONSTITUENTS

[75] Inventor: Scott L. Patton, Westerly, R.I.

[73] Assignee: The United States of America as represented by the Secretary of the Navy, Washington, D.C.

[ * ] Notice: This patent is subject to a terminal disclaimer.

[21] Appl. No.: 08/709,624

[22] Filed: Sep. 9, 1996

[51] Int. Cl.⁶ .................................................... G03C 5/00
[52] U.S. Cl. ............................................................. 430/321
[58] Field of Search ...................................... 430/321, 966

[56] References Cited

U.S. PATENT DOCUMENTS 5,061,032  10/1991  Meltz et al. .............................. 385/37
5,627,933   5/1997  Ito et al. ................................. 385/123
5,629,998   5/1997  Cook et al. ............................... 385/37
5,708,739   1/1998  Patton ....................................... 385/37

*Primary Examiner*—Maria Nuzzolillo
*Assistant Examiner*—Laura Weiner
*Attorney, Agent, or Firm*—Michael J. McGowan; Prithvi C. Lall; Michael F. Oglo

[57] ABSTRACT

A method and apparatus for establishing predetermined patterns in a selected region of an optical waveguide. A positioning device holds the waveguide proximate a radiation source. The radiation source defines a radiation pattern corresponding to the desired patterns. The resulting radiation patterns induce a loss in the light transmission capability in a portion of the waveguide that contains a radiation sensitive constituent and that the radiation penetrates. Thereafter the optical waveguide ages to reach an equilibrium state. Thereafter, the irradiated areas form the predetermined patterns in the optical waveguide. The patterns may take the form of Bragg gratings in the waveguide.

20 Claims, 2 Drawing Sheets

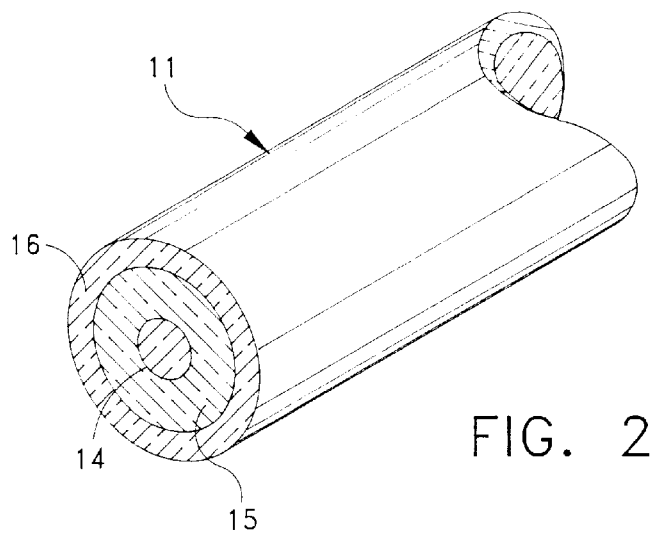
FIG. 2
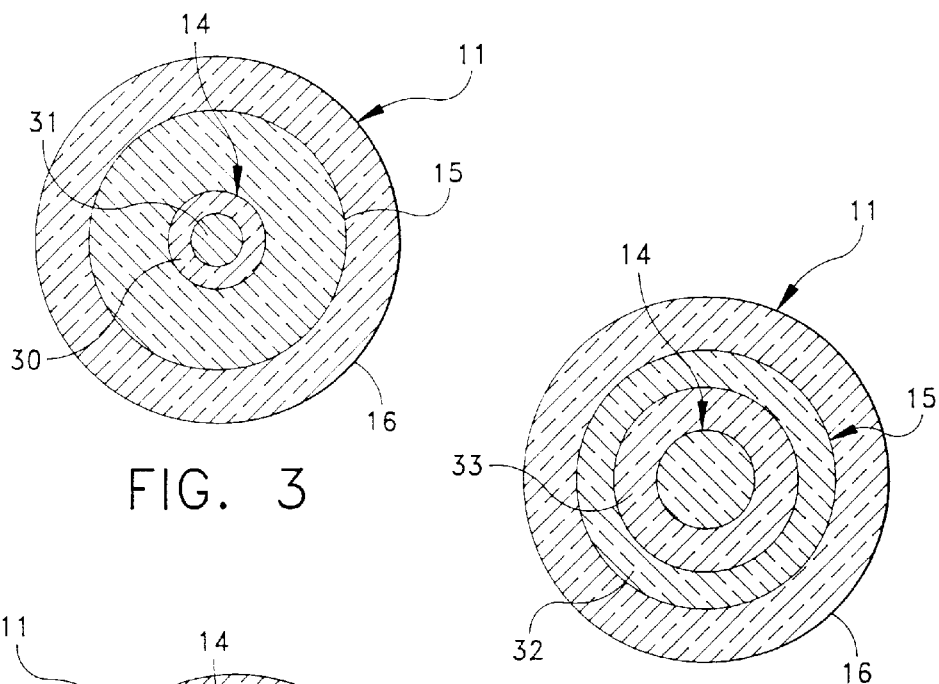
FIG. 3
FIG. 4
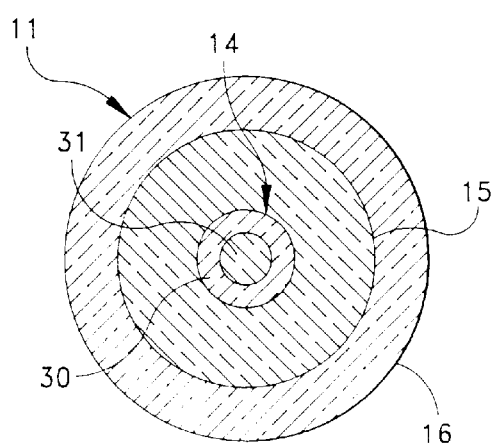
FIG. 5

METHOD FOR IRRADIATING PATTERNS IN OPTICAL WAVEGUIDES CONTAINING RADIATION SENSITIVE CONSTITUENTS

CROSS REFERENCES TO RELATED PATENT APPLICATIONS

The instant application is related to two U.S. Patent Applications entitled METHOD AND APPARATUS FOR PHOTOBLEACHING PATTERNS IN IRRADIATED OPTICAL WAVEGUIDES U.S. Pat. No. 5,708,739 issued Jan. 13, 1998; and FIBER OPTIC HANDLING AND COATING FIXTURE application for U.S. patent Ser. No. 08/708,423 filed Sep. 9, 1996 having same filing date.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates generally to a method and apparatus for processing optical waveguides and more particularly to a method and apparatus for irradiating patterns in such optical waveguides.

(2) Description of the Prior Art

Optical waveguides, including planar waveguides, fiber and fiber-like substrates such as fiber optic cable, are known. These waveguides may comprise a central, light transmissive, cylindrical or semi-cylindrical glass core surrounded by a light reflecting or retracting transmissive glass cladding. Such waveguides may include additional rings, semi-rings or layers of fusible glass or other refractive, reflective or protective materials.

A planar waveguide may incorporate all of the above attributes and may comprise additional attributes. They are normally formed in flat sheet(s) of glass or other known optical radiation transmissive materials. These waveguides may also be formed on non-flat sheet(s) of materials or on the surface of non-optically transmissive materials. The form of these waveguides are known to be substantially different from that commonly found in optical fibers. Various methods for forming these planar waveguides are known including chemical vapor deposition, sputtering, electron beam or ion beam implantation. These methods or combinations of methods allow much more complex patterns to be formed in a much more compact manner that are possible with optical fiber type waveguides.

It is also known to change the useful properties or characteristics of selected areas of such waveguides. For example, the following United States Letters Patent disclose waveguides with altered light transmission characteristics and methods for making such alterations:

| | |
|---|---|
| 3,916,182 (1975) | Dabby et al. |
| 4,182,664 (1980) | Maklad et al. |
| 4,400,056 (1983) | Cielo |
| 4,403,031 (1983) | Borrelli et al. |
| 4,636,031 (1987) | Schmadel, Jr. et al. |
| 4,776,661 (1988) | Handa |
| 4,725,110 (1988) | Glenn et al. |
| 4,793,680 (1988) | Byron |
| 5,042,897 (1991) | Meltz et al. |

-continued

| | |
|---|---|
| 5,061,032 (1991) | Meltz et al. |
| 5,066,133 (1991) | Brienza |
| 5,104,209 (1992) | Hill et al. |

The Dabby et al. patent discloses an optical waveguide comprising either a substrate coated with a layer of optic material or a clad optic fiber. A periodic variation in the index of refraction of either the substrate and/or the optical layer, the core and/or cladding of the optic fiber is introduced so that unwanted frequency components present in the optical signal passing through the waveguide are eliminated. The waveguide may be employed as a band-pass or a band-stop filter or for phase-matching purposes. Various means are disclosed for altering the periodicity of the index of refraction to thereby tune the device.

In the Maklad et al. patent optical fibers of silica and plastic composition are rendered relatively stable to nuclear radiation induced optical losses by pre-irradiating with a high initial radiation dose. Subsequent exposure of the radiation hardened fibers produces a substantially lower radiation induced optical loss and faster fiber transmission recovery rates.

The Cielo patent discloses a tunable optical fiber reflector together with a method of making such a reflector. A length of optical fiber has a core of a first light transmitting material, and a cladding of a second light transmitting material covering the core. The cladding is etched away to a predetermined thickness over a portion of the fiber. A layer of photoresist material is applied either to the etched portion of the fiber or to a thin metal blade, i.e., a mask, and then exposed to beams of light that optically interfere and generate a standing wave pattern in the material. The photoresist material is then developed to fix the wave pattern in the material. An optical discontinuity is formed in one of the core and cladding by that fixed wave pattern when the photoresist is on the etched section or when the developed mask is used to expose the core and cladding. This discontinuity represents a quasi-periodical fluctuation in the refractive index and causes evanescent waves in the cladding to be reflected. Such a discontinuity forms a distributed-feedback reflector.

In accordance with the Borrelli et al. patent optical patterns formed by localized optical density or refractive index variations in glass are produced by impregnating a porous glass support with a photolyzable organometallic compound and selectively exposing the glass to a photolyzing light source to cause the photolytic decomposition of the organometallic compound in exposed portions of the glass. The patterns are fixed, if desired, by removing unreacted organometallic compound from the pores.

The Schmadel, Jr. et al. patent discloses a tuned optical fiber grating and a tuning process. The gratings on the optical fiber are tuned so that the reflectance of the grating can occur at a specific wavelength. The process involves encasing that portion of the fiber containing the grating while shining light of the wavelength of desired reflectance through the fiber and stretching the grating until reflectance occurs. Thereafter, the tuned grating is sealed within a tube formed around the tuned grating.

An integrated optical device shown in the Handa patent performs optical data processing in an integrated arrangement using an optical waveguide. The waveguide comprises a substrate, a slab optical waveguide provided on the substrate, a channel optical waveguide provided at a portion of the slab optical waveguide, and a grating coupler provided with a grating structure at a portion of the channel optical waveguide to optically couple the slab optical waveguide and the channel optical waveguide.

In the Glenn et al. patent a dielectric periodic index of refraction phase grating is established upon the core of an optical waveguide by an intense angled application of several transverse beams of ultraviolet light. This enables the establishment of a distributed, spatially resolving optical fiber strain gauge.

The Byron patent discloses the use of a pulsed high-power laser beam incident on the surfaces of a wide variety of materials to produce ripples on such surfaces. These ripples result from an interference between scattered waves and an incident beam producing intensity fringes, and hence localized heating. The dimensions of the ripples are dependent on the wavelength of the incident light. Hence a grating whose length is a few hundreds of micrometers is produced. If the cladding is removed this effect of ripple generation is enhanced.

Optical waveguides disclosed in the Meltz et al. patents incorporate Bragg diffraction gratings. In both patents the grating element is formed in the core or the waveguide by exposing the core or waveguide to an interference pattern of two ultraviolet radiation beams that are symmetrical with respect to a plane extending at the oblique angle relative to the core or waveguide axis.

Apparatus for forming an extended length of Bragg gratings in an optical waveguide, as disclosed in the Brienza patent, includes a source that directs a coherent light beam of a frequency in the ultraviolet range in a primary path transversely toward the waveguide. A section of a diffraction grating extends through the primary path at a spacing from the waveguide, and the diffraction grating has a dimension normal to the primary path. Relative movement is effectuated between the waveguide and diffraction grating in unison and the primary path. Consequently, the light beam diffracts at the diffraction grating into two mutually frequency-shifted partial light beams propagating in diverging secondary paths. The partial light beams are caused to travel toward a shared location of the waveguide where they form an interference pattern that moves longitudinally of the waveguide but respective high intensity fringes of which extend through the waveguide at respective positions that are stationary relative to the waveguide to effect refractive index changes at such positions along an extended length of the waveguide.

The Hill et al. patent discloses a method of creating a grating in an optical fiber. This method comprises disposing a slit mask containing one or more slits over a side of an optical fiber and illuminating the fiber through the slit mask by substantially monochromatic ultraviolet light for a short interval, whereby an index grating line is created and stored in the core of the fiber.

The Dabby et al., Maklad et al., Cielo, Borrelli et al., Schmadel et al. and Handa patents alter characteristics by photolithographic, mechanical, chemical and other related processes. The Glenn, Byron, Meltz et al., Brienza and Hill et al. patents disclose generally the formation of a Bragg grating by irradiating an optical waveguide with light in particular bandwidths. Light in the green and ultraviolet spectra are particularly used normally with germania- or alumni-doped optical waveguides.

Bragg gratings established by such methods are of limited use as such gratings only refract light frequencies in limited frequency bands. These bands generally constitute only a portion of spectra used in most applications. Further, these methods produce gratings with germania doped fibers and normally along the entire length of the core fiber only.

Moreover, the processes disclosed by these references require both doped fibers reactive to ultraviolet light and lasers for generating ultraviolet light. Non-predictable variations in the level of photobleaching can occur particularly at boundaries between areas of normal light transmission. When this occurs, the refraction near the selected frequency can vary across a boundary area. Such variations can require tuning as described in the Schmadel et al. patent and can limit the usefulness of the fiber. Moreover, controls to limit such variations increase processing complexity and cost.

The references fail to teach a method and apparatus for forming patterns and particularly Bragg gratings in optical waveguides to refract or reflect light of a selected frequency at one or more predetermined cable locations. The references also fail to disclose a relatively simple procedure and apparatus for forming Bragg gratings that can be formed for refracting desired frequencies of light. Additionally, these references fail to provide a method and apparatus for forming patterns in a plurality of segments of a single or plurality of waveguides in a relatively simple and efficient manner. Finally, the references fail to teach or suggest apparatus and a method for forming patterns in optical waveguides formed of a wide variety of materials usable for producing optical waveguides.

SUMMARY OF THE INVENTION

An object of the present invention is to provide a method and apparatus to establish predetermined patterns in an optical waveguide.

Another object of the present invention is to provide a method and apparatus to establish Bragg gratings at a predetermined location in an optical waveguide.

A further object of the present invention is to provide a method and apparatus to form Bragg gratings at one or more predetermined locations in an optical waveguide.

A still further object of the present invention is to provide a relatively simple and effective method and apparatus for establishing a Bragg grating in an optical waveguide that is tuned to reflect or refract selected light in a specific frequency band.

According to one aspect of the present invention there is provided a method for establishing Bragg gratings or other predetermined patterns in an optical waveguide having a given light transmissivity partially dependent upon the presence of a radiation sensitive constituent in the optical waveguide. A focused nuclear radiation source irradiates selected regions of the optical waveguide in a predetermined pattern to effect a change in light transmissivity of portions of the region having the constituent. Aging allows the light transmissivity to reach a state of substantial equilibrium such that the portions of the regions having the constituent comprise Bragg gratings or other predetermined patterns.

According to another aspect of the invention there is provided a method for forming a Bragg grating or other predetermined pattern in a selected region of an optical waveguide having a given transmissivity of light dependent in part upon the presence of a radiation sensitive constituent therein. The optical waveguide is positioned in a stream of nuclear radiation patterned by passing the stream through a mask. The patterned stream irradiates areas of the waveguide corresponding to the pattern to thereby induce a loss in the light transmission capacity of the irradiated areas having the radiation sensitive constituent therein. The irradiated areas are aged to stabilize the induced loss of light transmission in the irradiated areas whereby the irradiated areas comprise a Bragg grating or other predetermined pattern.

According to a further aspect of this invention there is provided apparatus for establishing a Bragg grating or other predetermined pattern in an optical waveguide having a given light transmissivity partially dependent upon the presence of a radiation sensitive constituent. The apparatus comprises a nuclear radiation source for generating a stream of nuclear radiation over a selected region of the optical waveguide to induce a change in the light transmissivity of the waveguide. A positioning fixture holds the optical waveguide proximate the source. Subsequent aging enables the light transmissivity to return to substantial equilibrium such that the portions of the regions having the constituent comprise Bragg gratings or other predetermined patterns.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 2 is a perspective of a portion of the fiber optic cable of FIG. 1 extending generally in the direction of section line 2—2;

FIG. 3 is a front cross-sectional view of an area of the fiber optic cable of FIG. 1 having a Bragg grating element established in a portion of the core region;

FIG. 4 is a front cross-sectional view that is similar to FIG. 3 of a fiber optic cable having a Bragg grating element established in a portion of the reflective or refractive cladding region; and FIG. 5 is a front cross-sectional view that is similar to FIG. 3 of a fiber optic cable having a Bragg grating element established in the reflective or refractive cladding region and a portion of the core region.

DESCRIPTION OF THE PREFERRED EMBODIMENT

Figure 1:
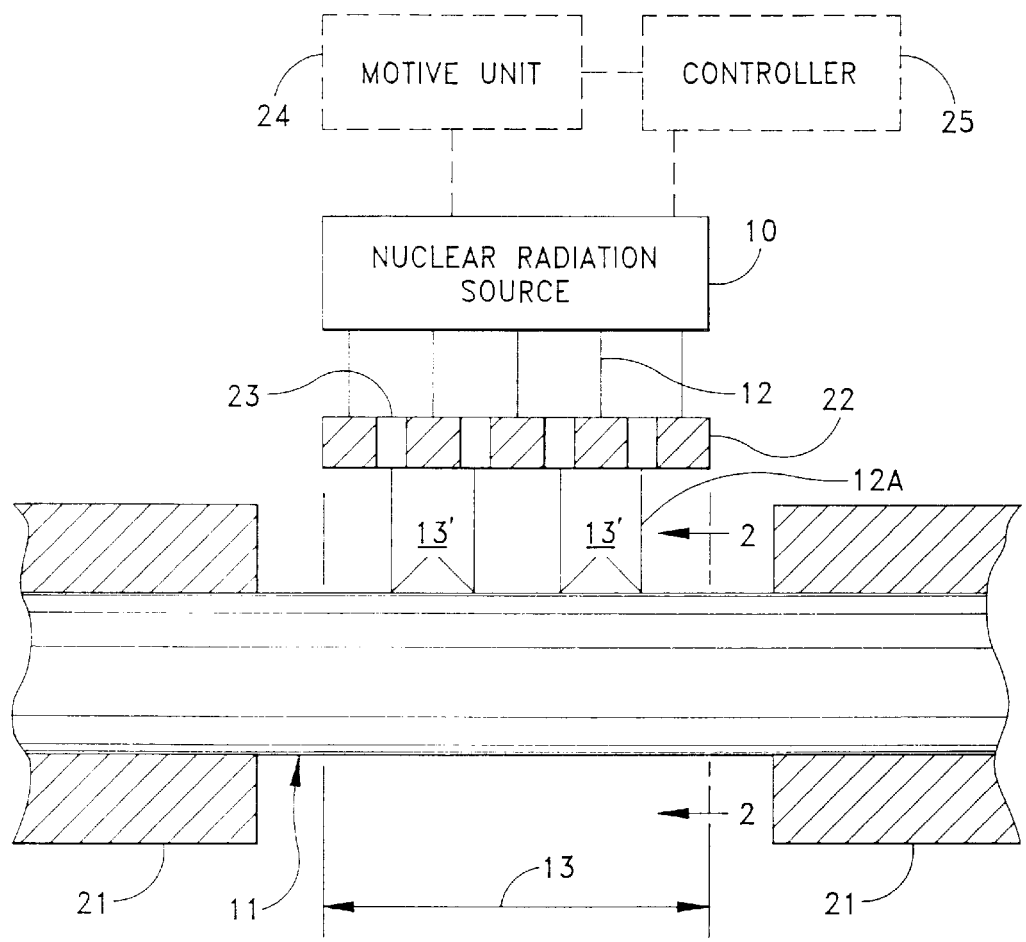
FIG. 1 is a partially diagrammatic, partially side elevational and cross-section view for understanding a process for forming a Bragg grating or other predetermined pattern in an optical waveguide according to the present invention.

FIG. 1 depicts apparatus useful in a process for forming predetermined patterns in optical waveguides according to this invention. Generally speaking, a radiation source 10 irradiates an optical waveguide 11 by generating a radiation stream 12 to irradiate, for example, a pattern of selected, spaced areas 13' of a region 13 of the optical waveguide. This spacing between the areas 13' may correspond to the distance between adjacent lines in a Bragg grating to be formed thereby. The optical waveguide includes a radiation sensitive constituent that is determinative of light transmissivity through the optical waveguide 11. Irradiating the optical waveguide 11 with an irradiation pattern alters this constituent at the exposed areas 13' and induces a loss in the transmissivity in the exposed areas 13'.

When the optical waveguide 11 is isolated from the radiation source 10, the transmissivity through the optical waveguide 10 recovers to an equilibrium value. That is, after the irradiation, the optical waveguide 11 "ages" so that over time, the loss in light transmissivity decreases. After some interval the change in loss with time becomes negligible. Thus, after aging, the induced loss of transmissivity to the irradiation reaches an equilibrium. Typically this will require about 24 hours.

When the aging process is complete, the predetermined pattern is formed in the irradiated areas 13'. The pattern may be that of a Bragg grating having a line pattern corresponding to the irradiation pattern. As described more fully hereinafter, the depth of the pattern in the optical waveguide also can be controlled.

As shown in FIG. 2, the optical waveguide 11 comprises a three-glass optical waveguide with an inner transmission path or core 14 surrounded by an optically transmissive refractive or reflective cladding 15. An outer fusible layer coating 16 overlies the refractive or reflective cladding 15. A two-glass fiber omits the fusible layer 16. That is, a two-glass optical waveguide comprises the central core 14 and refractive or reflective cladding 15. Either of these types of optical waveguides may, as known, be sheathed by a protective material although no such sheathing is shown.

In accordance with this invention, any protective material and outer fusible coating 16, if present, normally will be removed over the area to be irradiated. Typically the central core 14 includes a constituent that is radiation sensitive such as silicon or a dopant of germania, europium or alumina. The reflective cladding may also include such a constituent. This invention will provide the desired features if the constituent is located in the core 14, in the refractive or reflective cladding 15 or both the refractive or reflective cladding 15 and the core 14.

Referring again to FIG. 1, as an initial step in the process the radiation source 10 directs the radiation stream 12 onto the selected 13' of the region 13 of the optical fiber 11 to establish the predetermined pattern. The radiation source 10 preferably generates beta radiation or low energy X-ray radiation, but a source generating gamma or neutron radiation may also be used. Irradiation of the 13' acts upon any dopant or other radiation sensitive constituents in the core 14 and refractive or reflective layer 15.

In FIG. 1 a fixture 21 supports the selected region 13 downstream of the radiation source 10. Such a support may comprise a fixture 21 of the type disclosed and described in patent application titled Fiber Optical Handling and Coating Fixture application for U.S. patent Ser. No. 08/708,423 filed Sep. 9, 1996 which is commonly assigned with the present application and is incorporated by reference herein. This fixture allows a simultaneous irradiation of a plurality of spaced regions, like the region 13. It will be understood that the spaced regions could also be irradiated individually. It is also possible to irradiate each of the selected 13' individually or simultaneously.

FIG. 1 also depicts, in phantom, components of the radiation source 10 that control the irradiation step and produce the pattern desired. For example, in FIG. 1, a mask 22 produces a pattern by selectively blocking a portion of the radiation stream 12 and passes the remaining portion of the stream. That is, the mask 22 produces a pattern of fine lines of irradiation 12A that impinge simultaneously but only on the 13' in any region 13 downstream of the mask 22. Preferably the radiation transparent windows of the mask 22, such as windows 23 are relatively large with respect to the wavelength of the incident radiation so that the windows do not diffract the radiation stream 12 as it passes through the mask causing the generation of an interference pattern at the optical waveguide 10 in the stream 12A. Such windows also tend to collimate the stream 12 so that the radiation stream 12A corresponds in shape and size to the windows with sharp demarcations corresponding to the window's edges. This establishes the predetermined pattern in waveguide 11 that also have corresponding sharp demarcations, shapes and sizes. The pattern may be such as to establish Bragg grating elements.

FIG. 1 further depicts in phantom a motive unit 24 for moving the source 10 or directing its radiation output for controlling the intensity of the radiation and the region, or scanning discrete areas and regions with radiation or both. A controller 25, such as programmable microprocessor could also be used, to provide control signals to either or both the motive unit 24 and the radiation source 10 to control the intensity, duration, and positioning of the radiation stream 12 relative to the optical waveguide 11.

Some radiation sources 10, like a scanning electron beam microscope generate a focused, steerable beam. In that case the motive unit 24 and the controller 25 can be replaced with apparatus for scanning the focused beam over the 13' to irradiate each area 13' in sequence without the need for a mask.

Thus, it should now be understood that any one of several radiation sources 10 can be used in accordance with this invention. In one type a relatively wide stream 12 of radiation passes through a mask 22; in another, the source 10 generates a relatively focused beam that can scan selected areas. Examples of such sources include, for example, electron accelerators and electron beam microscopes, respectively.

In any event irradiation of the core 14, refractive or reflective cladding 15 or both having the radiation constituent changes the refractive index of the material to produce a loss in the light transmission capacity of the 13'.

Controlling the intensity, type and energy of the irradiation and exposure time determine the characteristics of the loss in light transmissivity in the 13' and the depth of that loss in the optical waveguide 11. More specifically, if only the core 14 contains a radiation sensitive constituent, the irradiation source should produce a pattern having an energy level that enables the irradiation to pass through the cladding 15 and into the core 14. If the cladding 15 or if both the cladding 15 and the core contain the radiation-sensitive constituent, the irradiation source 10 should produce a pattern having an energy level that enables the irradiation to pass only through a selected portion of the cladding. The selection of these characteristics for different materials is well known in the art. Similarly, the total dose, and hence the irradiation time, will also be selected to match the energy and type of radiation of a particular application. The methods for selecting these parameters are also well known in the art.

For example, irradiating an 11% mole weight germania doped core (e.g., an AT&T Multimode Natural 1 fiber optic cable) with a 50 nanosecond pulse of 1.5 MeV electrons for an exposure of approximately $10^5$ rads induces an approximate loss of 200 db per kilometer in the core 14 after aging.

Since directing the radiation stream 12 through patterning means like the windows 23 of the mask 22 or employing a radiation source 10 that produces a focused beam form well defined areas of induced loss and enable the pattern to have fixed or variable line spacings, the resulting Bragg gratings can disperse light over a broad band. Such Bragg gratings also exhibit a reduced temperature sensitivity compared to gratings formed by the prior art methods and do not require tuning after processing.

It should now also be understood that, for example, by rotating an optical waveguide in the radiation stream 12 about its longitudinal axis Bragg gratings or other predetermined patterns can be written which extend about such waveguide. Thus, controlling the intensity and duration of the radiation to irradiate only a portion of an area having the radiation sensitive constituent can produce ring patterns in the optical waveguide. FIGS. 3, 4, and 5 represent formation of such ring patterns formed by rotating the optical waveguide 11 in the radiation stream 12 and limiting the penetration of the radiation through the refractive or reflective cladding 15 and core 14 of the optical waveguide 11.

More specifically, assume that the optical waveguide 11 is rotated along its longitudinal axis, that only the core 14 contains the radiation sensitive constituent and that the patterned radiation stream from the source 10 penetrates through the core 14 in the 13'. The resulting pattern formed in the 13' will exist across the core 14. However, if the radiation intensity and duration is controlled so that the range of the radiation is limited to only a portion of the core 14, then only the irradiated portion will have a pattern formed therein. Thus, as depicted in FIG. 3, penetration of the radiation radially through only a portion 30 of the core 14 forms a pattern therein overlying a portion 31. The pattern may be Bragg grating elements.

Alternatively, if the refractive or reflective cladding 15 contains the radiation sensitive element, directing the radiation stream 12 through the reflective cladding 15 forms predetermined pattern in the reflective cladding 15 of the 13'. If, however, the range of the radiation is limited to only a portion 32 overlying a portion 33 of the refractive or reflective cladding, as depicted in FIG. 4, the predetermined pattern will form only in the portion 32 of each of the 13'. Again, the pattern may be such as to establish Bragg grating elements.

Likewise, assuming both the core 14 and the reflective cladding 15 contain the radiation sensitive constituent, irradiation of one of the 13' with nuclear radiation forms the predetermined pattern in the fiber corresponding to the penetration of the radiation. Patterns, including Bragg gratings, can be formed in each of the 13' that extend (1) only partially into the refractive or reflective cladding 15 like that depicted in FIG. 4, (2) across the refractive or reflective cladding 15, (3) across the refractive or reflective cladding 15 and partially into the core 14 as shown in FIG. 5, or (4) across both the refractive or reflective cladding 15 and the core 14.

Those skilled in the art will readily appreciate that optical waveguides having predetermined patterns formed in less than all of the core and/or refractive or reflective cladding have many uses. For example, an optical waveguide with a Bragg grating in the refractive or reflective cladding layer as depicted in FIG. 4, is particularly useful in an alarm sensing application. That is, certain fiber optic cables materials tend to change physical properties (e.g., size) with the transmission of certain light frequencies. Thus, transmission of a light frequency may tend to thin the refractive or reflective cladding 15, such that overtime portion 33 will be destroyed and light will enter the portion 32. Provided that the Bragg grating formed in the portion 32 diffracts such light frequencies, the event can be detected.

Predetermined patterns in accordance with this invention may be established in optical waveguides formed of any material that exhibits a loss in transmission capacity in response to irradiation with nuclear radiation. Thus, this method and apparatus is not limited to specially doped materials such a germania doped silica as are most of the prior art methods. Additionally, this invention enables the formation of patterns with relatively sharp boundaries and at predetermined locations with relatively sharp boundaries. This feature enables consistent formation of tuned Bragg gratings for diffraction of predetermined frequencies of light without further processing. Further, this invention enables the formation of patterns in various layers of planar waveguides.

In summary, the present invention comprises both a method and apparatus for establishing Bragg gratings or other predetermined patterns in a selected region of an optical waveguide having a radiation sensitive constituent. A radiation source generates and emits nuclear radiation so as to impinge on an optical waveguide in a predetermined pattern which may correspond to a desired Bragg grating. The irradiation of portions of the waveguide with the radiation sensitive constituent induces a loss in the optical transmissivity of the waveguide in such irradiated portions. The induced loss of transmission capacity of the areas stabilizes at a steady-state level over time and defines the final characteristics of the predetermined pattern or Bragg grating.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for establishing a predetermined pattern in a selected region of an optical waveguide of indeterminate length wherein the optical waveguide has a given light transmissivity partially dependent upon the state of a radiation sensitive constituent present in the optical waveguide, said method comprising the steps of:

irradiating areas of the selected region of the optical waveguide according to the predetermined pattern with a radiation stream from a nuclear energy source to effect a change in the radiation sensitive constituent according to the predetermined pattern thereby to produce a predetermined change in the light transmissivity of the optical waveguide in the irradiated areas; and aging the optical waveguide to enable the properties of the radiation constituent and light transmissivity in the irradiated area to reach a state of substantial equilibrium.

2. A method for establishing a predetermined pattern as recited in claim 1 wherein said irradiation step directs radiation in the predetermined pattern to a plurality of selected regions successively to thereby irradiate areas corresponding to the predetermined pattern in each of the plurality of regions and form the predetermined pattern in each of the irradiated regions.

3. A method for establishing a predetermined pattern as recited in claim 1 further comprising the step of controlling the pattern of the radiation stream at the optical waveguide to correspond with the predetermined pattern.

4. A method for establishing a predetermined pattern as recited in claim 3 further comprising the step of controlling the beam of nuclear radiation at the optical waveguide thereby to control the depth of irradiation into the optical waveguide.

5. A method for establishing a predetermined pattern as recited in claim 4 wherein said radiation stream pattern control includes selectively scanning a focused radiation beam from the nuclear energy source so as to direct radiation on the selected areas of the waveguide corresponding to the predetermined pattern.

6. A method for establishing a predetermined pattern as recited in claim 1 wherein said irradiation stream pattern control includes the step of focusing a beam of radiation from a radiation source onto the waveguide in the selected region and scanning the focused beam of radiation over the optical waveguide to irradiate the areas according to the predetermined pattern.

7. A method for establishing a predetermined pattern as recited in claim 1 wherein said irradiation step directs radiation in the predetermined pattern at a plurality of discrete regions in the waveguide simultaneously to thereby irradiate areas corresponding to the predetermined pattern in each of the plurality of regions and form the predetermined pattern in each of the irradiated regions.

8. A method for establishing a predetermined pattern as recited in claim 1 wherein said irradiation step includes controlling the pattern of the radiation stream at the optical waveguide to correspond with the predetermined pattern whereby the selected areas of the region corresponding to the predetermined pattern are irradiated by said irradiation step.

9. A method for establishing a predetermined pattern as recited in claim 1 wherein said irradiation step additionally includes controlling the duration and intensity of the radiation stream from the radiation source.

10. A method for establishing a predetermined pattern as recited in claim 1 wherein the optical waveguide comprises a first material and a second material, said constituent appearing in one of the first and second materials and the other of the first and second materials is substantially free of any such constituent such that said irradiation step substantially effects the light transmissivity of the one of the first and second materials containing the constituent while the light transmissivity of the other of the first and second materials remains substantially constant.

11. A method for establishing a predetermined pattern as recited in claim 10 wherein the optical waveguide comprises a central core of said first material and a refractive cladding of said second material.

12. A method for establishing a predetermined pattern as recited in claim 11 wherein the core material contains the constituent material and wherein said irradiation step produces the predetermined pattern in the central light transmissive core.

13. A method for establishing a predetermined pattern as recited in claim 12 wherein the core extends along an axis and said irradiation step includes directing the radiation stream toward the cable an angle substantially transverse to the axis of the cable.

14. A method for establishing a predetermined pattern as recited in claim 12 wherein said irradiation step additionally includes controlling the nuclear energy source thereby to control the irradiation of the core.

15. A method for establishing a predetermined pattern as recited in claim 11 wherein the second material contains the constituent material and said irradiation step produces the predetermined pattern in the refractive cladding of the optical waveguide.

16. A method for establishing a predetermined pattern as recited in claim 15 wherein the refractive cladding extends along an axis and said irradiation step includes directing the beam of nuclear radiation stream through the refractive cladding transverse to the axis to irradiate the refractive cladding in the predetermined pattern and thereby produce a pattern in the refractive cladding corresponding to the predetermined pattern.

17. A method for establishing a predetermined pattern as recited in claim 15 wherein said irradiation step further includes controlling the nuclear energy source the nuclear energy source to control the nature and extent of the radiation stream in the refractive cladding.

18. A method for establishing a predetermined pattern as recited in claim 17 wherein said irradiation step includes scanning a focused radiation stream beam externally of the optical waveguide and generally transverse to the length of the optical waveguide and radially and wherein said controlling step controls the depth of irradiation of the refractive cladding corresponding to the predetermined pattern whereby a pattern is formed along an outer surface of the refractive cladding and extending centrally into the cable.

19. A method for establishing a predetermined pattern as recited in claim 11 wherein said irradiation step additionally includes controlling the duration and intensity of the radiation stream at the optical waveguide whereby a portion of the one material with the constituent irradiated in the predetermined pattern comprises the predetermined pattern and the transmission capacity of the remainder of the one material with the constituent and the other material without the constituent remains substantially constant.

20. A method for establishing a predetermined pattern as recited in claim 1 wherein the optical waveguide comprises a fiber optic cable having a central core and a refractive cladding overlaying the central core, each of the core and the cladding containing the radiation sensitive constituent and said irradiation step additionally includes generating a radiation stream, directing the radiation stream in the predetermined pattern, and controlling the duration and intensity of the radiation stream so as to control the extent of the predetermined pattern formed thereby.

\* \* \* \* \*